US008801587B2

(12) United States Patent
Fenelon et al.

(10) Patent No.: US 8,801,587 B2
(45) Date of Patent: Aug. 12, 2014

(54) CONCRETE WASH WATER SOLIDIFICATION PRODUCTS AND METHODS

(75) Inventors: Terrance P. Fenelon, Mendota Heights, MN (US); Thomas Vaughn, Maple Grove, MN (US)

(73) Assignee: Mix Manufacturing, Inc., St. Paul, MN (US)

( * ) Notice: Subject to any disclaimer, the term of this patent is extended or adjusted under 35 U.S.C. 154(b) by 216 days.

(21) Appl. No.: 13/325,645

(22) Filed: Dec. 14, 2011

(65) Prior Publication Data

US 2012/0157745 A1    Jun. 21, 2012

Related U.S. Application Data

(60) Provisional application No. 61/423,252, filed on Dec. 15, 2010.

(51) Int. Cl.
*B09B 1/00* (2006.01)

(52) U.S. Cl.
USPC .......................................................... 588/255

(58) Field of Classification Search
USPC .......................................................... 588/255
See application file for complete search history.

(56) References Cited

U.S. PATENT DOCUMENTS

| | | | |
|---|---|---|---|
| 5,145,061 A * | 9/1992 | Marceau | 206/223 |
| 5,481,064 A * | 1/1996 | Kato et al. | 588/255 |
| 5,868,087 A | 2/1999 | Salestrom | |
| 6,277,772 B1 | 8/2001 | Gancet et al. | |
| 6,623,848 B2 | 9/2003 | Brehm et al. | |
| 7,163,745 B2 | 1/2007 | Mangold et al. | |
| 7,329,701 B2 * | 2/2008 | Herfert et al. | 524/445 |
| 2004/0144682 A1 * | 7/2004 | Altmayer | 206/524.7 |

OTHER PUBLICATIONS http://www.newton.dep.anl.gov/askasci/eng99/eng99272.htm
"Newton Ask a scientist" dated Mar. 2004, printed Jan. 20, 2014.*
Water Waste Treatment System for Wastewater Removal, RTC Supply, www.rtcsupply.com/products/agua-solution-all/what/html, dated Dec. 12, 2011.
Disposal of Concrete and Wastewater, RTC Supply, www.rtcsupply.com/products/concrete-washout-all/disposal.html, dated Dec. 12, 2011.

* cited by examiner

*Primary Examiner* — John Kreck
(74) *Attorney, Agent, or Firm* — HolzerIPLaw, PC

(57) ABSTRACT

A method for solidifying cementitious wastewater by combining the wastewater with a super absorbent polymer composition that includes a UV-stabilizer to form a mixture and disposing of the mixture as solid construction waste. The UV-stabilizer may be a stabilizing additive in the super absorbent polymer composition that inhibits the reversion from a solid or semi-solid mixture back to a liquid. In some embodiments, the method includes placing the mixture in UV-light non-transmissive packaging. After placing the mixture in the UV-light non-transmissive packaging, the package is closed and can be permanently sealed. The sealed package with solidified material therein can then be disposed as solid construction waste. The super absorbent polymer composition can include zeolite or other molecular sieves.

11 Claims, 1 Drawing Sheet

CONCRETE WASH WATER SOLIDIFICATION PRODUCTS AND METHODS

CROSS-REFERENCE TO RELATED APPLICATION

This application claims the benefit of U.S. Provisional application No. 61/423,252 filed Dec. 15, 2010 entitled "Concrete Wash Water Solidification Products and Methods", the entire disclosure of which is incorporated herein.

FIELD OF THE INVENTION

This invention generally relates to products and processes for reducing and even eliminating rinse water waste from processes that utilize cementitious products such as concrete, mortar, grout, and the like. The invention is directed to combining the wastewater with a super absorbent polymer material, and disposing of the mixture as solid waste.

BACKGROUND OF THE INVENTION

Construction sites that utilize cementitious products such as concrete and mortar have long been known as a possible source of ground water contamination if pollution prevention practices are not properly and regularly performed. Rinse water from cementitious processes if washed onto the ground or into a storm drain can have a direct impact on local water sources. It is desired to reduce and preferably eliminate the possibility of this wastewater entering the water system.

The present disclosure provides products, systems and methods that are a benefit to the environment by reducing and even eliminating liquid wastewater.

BRIEF SUMMARY OF THE INVENTION

This invention provides a practical and 'green' alternative to disposing of cementitious residue and rinse water by converting the liquid to a solid or semi-solid material. The solid material can then be disposed by conventional means, such as in a landfill. This invention provides a straightforward and practical system, that when implemented as designed, eliminates or reduces the expulsion of used or dirty rinse water into the environment.

The invention utilizes a super absorbent polymer (SAP), such as sodium polyacrylate. When combined with water or other aqueous material, the SAP absorbs the water and the result is a gelatinous compound that is sufficiently solid that it can be disposed of as a conventional solid material, for example, in a construction landfill. An additive may be added to the SAP to further entrap materials such as heavy metals from the cementitious wastewater. The invention includes a UV-stabilizer in conjunction with the SAP to inhibit degradation of the gelatinous compound by UV radiation (e.g., UV light, including visible light). It has been found that upon exposure, UV radiation may revert part or all of the gelatinous mixture back to a liquid form; addition of a UV-stabilizer inhibits the reversion or degradation. In some embodiments, the UV-stabilizer is a physical item that blocks UV-radiation from the gelatinous compound. An example of a preferred UV-stabilizer is a packaging item, such as a UV-light resistant package, in which the gelatinous compound is stored prior to disposal. The UV-light resistant package inhibits exposure of the SAP-wastewater gelatinous mixture to ultraviolet light, visible light or other forms of UV radiation. In other embodiments, the UV-stabilizer is a stabilizing additive present in or with the SAP, which stabilizes or inhibits degradation of the gelatinous compound by UV radiation (e.g., UV light). Examples of UV-stabilizing additives include a particulate additive, a treatment on the SAP, and a liquid additive.

A first particular embodiment of this disclosure is a rinse water or wastewater solidification system that includes composition comprising a super absorbent polymer (SAP), such as sodium polyacrylate. The SAP composition is mixed with wastewater to form a gelatinous mixture that can be readily shoveled. The SAP composition and wastewater are mixed in a UV-light resistant package, producing the gelatinous mixture, or the gelatinous mixture is transferred to a UV-light resistant package after being formed. The packaged mixture can then be disposed as a solid waste, for example, in a landfill.

A second particular embodiment of this disclosure is directed to a method for solidifying wastewater comprising cementitious residue. The method includes combining the wastewater with a super absorbent polymer composition to form a mixture, and placing the mixture in UV-light non-transmissive packaging. The packaging with the mixture therein is then closed. The packaging with the mixture therein may be permanently sealed. After being sealed, the packaging can be discarded.

A third particular embodiment of this disclosure is a rinse water or wastewater solidification system that includes composition comprising a super absorbent polymer (SAP), such as sodium polyacrylate, and a UV-stabilizing additive. The SAP composition is mixed with wastewater to form a gelatinous mixture that can be readily shoveled. Even after exposure to UV-radiation, the packaged mixture can then be disposed as a solid waste, for example, in a landfill.

The super absorbent polymer composition, either with or without UV-stabilizer, may include super absorbent polymer and an additive, such as an adsorbent or absorbent. The composition may include zeolite or other molecular sieves. The amount of super absorbent polymer composition used per gallon of wastewater may be about 1 to 4 ounces.

Another particular embodiment of this disclosure is directed to a super absorbent polymer composition that includes super absorbent polymer and zeolite. The super absorbent polymer may be sodium polyacrylate. The super absorbent polymer may be present as at least two different particle size ranges.

These and various other features and advantages will be apparent from a reading of the following detailed description.

BRIEF DESCRIPTION OF THE DRAWING

The invention may be more completely understood in consideration of the following detailed description of various embodiments of the invention in connection with the accompanying drawing, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF THE INVENTION

Figure 1:
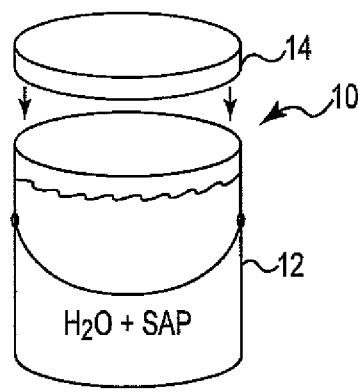
FIG. 1 is a schematic diagram of a first embodiment of a system according to this disclosure.

The present disclosure provides products, systems and methods for disposing of cementitious residue and rinse water by converting liquid to a solid or semi-solid material. The solid material can then be disposed by conventional means, such as in a landfill. This invention provides a straightforward and practical system, that when implemented as designed, eliminates or reduces the expulsion of used or dirty rinse water into the environment.

The invention utilizes a super absorbent polymer (SAP) composition. When combined with water or other aqueous material, the SAP composition absorbs the water and the result is a gelatinous compound that is sufficiently solid that it can be disposed of as a conventional solid material. An additive may be present in the SAP composition to further entrap materials such as heavy metals from the cementitious water. The invention also includes a UV-stabilizer that inhibits the reversion of the gelatinous compound back to liquid. The UV-stabilizer may be a UV-light resistant package in which the gelatinous compound is stored prior to disposal. Alternately or additionally, the UV-stabilizer may be a UV-stabilizing additive present in the SAP composition.

Super absorbent polymers (SAP), also occasionally called slush powders, are polymers that can absorb and retain extremely large amounts of liquid relative to their own mass. SAPs, which are classified as hydrogels when cross-linked, absorb water and aqueous solutions through hydrogen bonding with water molecules. A SAP's ability to absorb water is a factor of the ionic concentration of the aqueous solution. In deionized and distilled water, a SAP may absorb 500 times its weight (from 30-60 times its own volume), but when put into a 0.9% saline solution, the absorbency drops to maybe 50 times its weight. The presence of valent cations in the solution will impede the polymer's ability to bond with the water molecule.

Low density cross-linked SAPs generally have a higher absorbent capacity and swell to a larger degree. These types of SAPs also have a softer and more sticky gel formation. High cross-link density polymers exhibit lower absorbent capacity and swell, but the gel strength is firmer and can maintain particle shape even under modest pressure. Both low density and high density cross-link SAPs are suitable for use in this invention.

SAPs are typically in powder or particulate form (e.g., beads) and are readily available from a variety of commercial suppliers in numerous particle sizes. Examples of suitable sizes (i.e., average particle size) of SAP powder or particles include 1 millimeter, 2.5 millimeter, and 4 millimeter. In some embodiments of this invention, it is preferred to have a wide range of particle sizes of SAP with which the wastewater is mixed. A source of SAP with a broad particle size may be available from a supplier, or two or more different sizes of SAP may be mixed to provide the broad range. It is understood that when a "particle size" of a sample is provided, the sample typically has a bell-curve distribution of particle sizes, with an average particle size defining a peak of the bell-curve. If two or more different sizes of SAP particle sizes are mixed, the difference in the sizes should be sufficiently large that at least two distinct particle size peaks are evident, when the overall particle size distribution is evaluated. For example, a 500 micrometer average particle size sample could be mixed with a 2.5 millimeter average particle size sample; as another example, a 1 millimeter average particle size sample could be mixed with a 4 millimeter average particle size sample. In some embodiments of this invention, a particle size difference between two mixed SAP samples is at least 50% (e.g., 1 mm to 1.5 mm), in other embodiments at least 100% (e.g., 1 mm to 2 mm), in other embodiments at least 200% (e.g., 1 mm to 3 mm), and in other embodiments at least 300% (e.g., 1 mm to 4 mm).

To the SAP may be added fillers or additives to adsorb, absorb, react with, or otherwise entrap certain ingredients of the cementitious material of contaminants that may be present in the wastewater. For example, chrome, a heavy metal, and its oxides or salts are typically present in cement and thus in cementitious materials such as concrete and mortar. Examples of additives that may be useful include polymer particulates including ion exchange resins, sodium bisulfate, carbon media (e.g., activated carbon), zeolites, molecular sieves, getters, clays, silica gels, superacids and/or heteropolyacids, nanosorbents, nanotubes, and metal oxides.

Zeolite, a microporous aluminosilicate mineral, is one preferred adsorbent additive in a SAP composition according to this disclosure. Clinoptilolite, a naturally occurring zeolite material, is a crystalline alumina silicate with micropores capable of adsorbing large quantities of moisture. Clinoptilolite is similar to another better known zeolite, emerald, but is much less costly. Zeolites are particularly useful for entrapping chrome and chromium and inhibiting their leaching within and out from the solidified SAP. Examples of suitable sizes of zeolite include those at least 0.5 mm in diameter, at least 1 mm in diameter, and those at least 2 mm in diameter. A level of zeolite suitable in the SAP composition is at least 1 wt-%, usually at least 2 wt-%. In some embodiments, the level of zeolite is at least about 5 wt-% or at least about 10 wt-%, e.g., 15-25 wt-%.

The systems of this disclosure utilize SAP together with any additives to solidify wastewater from cementitious processes. The SAP composition is added to wastewater (or other aqueous mixture) to be solidified, usually at about 1 to 10 ounces of SAP composition per gallon of water. In some embodiments, about 4 ounces per gallon are used, whereas in other embodiments about 2 ounces per gallon water are used, and yet in other embodiments about 1 ounce per gallon is used.

After the SAP composition is added to the wastewater, the mixture may be mixed, although this is not required. Even if not mixed, the SAP composition will eventually solidify, at least to a gelatinous state, entrapping the water. After the water has been gelatinized, it can be readily handled as a solid, e.g., scooped or shoveled.

Figure 2:
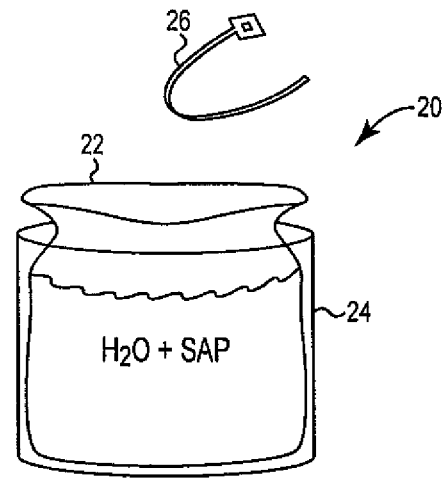
FIG. 2 is a schematic diagram of a second embodiment of a system according to this disclosure.
Figure 3:
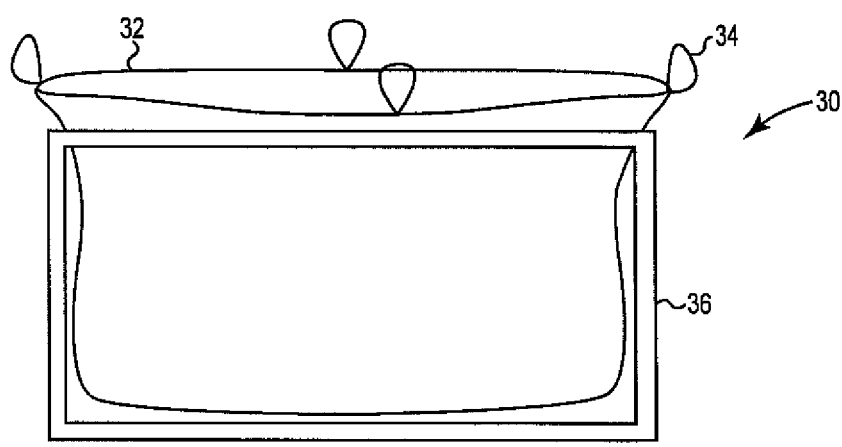
FIG. 3 is a schematic diagram of a third embodiment of a system according to this disclosure.

According to this invention, the SAP composition may also include a UV-stabilizer that inhibits the reversion of the gelatinous compound back to liquid. The UV-stabilizer may be a UV-light resistant package in which the gelatinous compound is stored. Alternately or additionally, the UV-stabilizer may be a UV-stabilizing additive present in the SAP composition. In some embodiments, the solidified wastewater is either present in or placed in packaging that is UV-light resistant, and preferably impermeable to UV-light. FIGS. 1 through 3 provide various examples of packaging that is UV-light resistant.

Referring to FIG. 1, a system 10 is illustrated for solidifying wastewater. System 10 includes a rigid container such as a bucket 12 with a lid 14. Bucket 12 and lid 14 are made from material that is non-transmissive to UV-light therethrough. Examples of suitable materials for bucket 12 and lid 14 include metal, plastic (e.g., PETE (polyethylene terephthalate), HDPE (high density polyethylene), vinyl, PP (polypropylene), etc.) and cellulosic materials that are at least water resistant (e.g., lined pressed paperboard).

To use system 10, bucket 12 is used to rinse tools and other items dirtied with cementitious material residue. Either during the rinsing process or after, SAP composition is added to the wastewater in bucket 12 and the mixture is optionally stirred. The SAP composition and water form a gelatinous material or matrix, entrapping cementitious residue and other residue. When bucket 12 is sufficient full of gelatinous material, lid 14 is placed onto bucket 12 and the entire bucket 12 with lid 14 is discarded.

An alternate system is illustrated in FIG. 2 as system 20. System 20 includes a flexible, UV-light resistant bag or liner 22 removably positioned in a rigid container 24 (e.g., 5 gallon bucket, 20 gallon drum, 55 gallon drum). Rigid container 24 may or may not be non-transmissive to UV-light. In most embodiments, liner 22 is a plastic bag, such as a conventional garbage bag that is sufficiently strong to support the eventual water and SAP material within. System 20 also includes a fastener 26 to seal liner 22.

To use system 20, container 24 with liner 22 are used to rinse tools and other items dirtied with cementitious material residue. Either during the rinsing process or after, SAP composition is added to the wastewater in liner 22 and the mixture is optionally stirred. The SAP composition and water form a gelatinous material or matrix, entrapping cementitious residue and other residue. When liner 22 is sufficiently full, liner 22 is sealed with fastener 26, removed from container 24, and is discarded. In some embodiments, filled liner 22 may be left in container 24, and container 24 discarded together with filled liner 22.

Another system is illustrated in FIG. 3 as system 30. System 30 includes a flexible, UV-light resistant bulk bag 32 removably positioned in a rigid frame 36 (e.g., 6 ft×6 ft×3 ft tall). Bulk bag 32 includes a plurality of loops 34, which can be fastened together to seal bag 32.

To use system 30, tools and other items dirtied with cementitious material residue, such as portable cement mixers, concrete trucks, etc., are rinsed so that the dirty rinse water is collected in bag 32. Either during the rinsing process or after, SAP composition is added to the wastewater in bag 32 and the mixture is optionally stirred. The SAP composition and water form a gelatinous material or matrix, entrapping cementitious residue and other residue. When bag 32 is sufficiently full, bag 32 is sealed by bringing together and fastening loops 34. Filled bulk bag 32 can be lifted out from frame 36, for example by a forklift or crane, and discarded.

The wastewater, when mixed with the SAP composition and retained in UV-resistant packaging, solidifies to and remains at least a semi-solid or gelatinous consistency, sufficiently solid to be disposed of in a construction material landfill.

Additionally or alternatively, wastewater may be mixed with a SAP composition that includes a UV-stabilizing additive that inhibits the reversion of the gelatinous, semi-solid or solid mixture back to a liquid state. Examples of UV-stabilizing additives include a particulate additive, a treatment on the SAP, and a liquid additive combined with the SAP. More particular examples of UV-stabilizing additives include organic chemical compounds that absorb ultraviolet light, and organic particulates that mostly absorb light like organic chemical compounds, but contain multiple chromophores. Chromophores may reflect and scatter a fraction of light like inorganic particulates, but behave differently in formulations than organic chemical compounds. Since the UV-attenuating efficacy depends strongly on particle size, the UV-stabilizing material is micronised to particle sizes below 200 nm. Another particular example of UV-stabilizing additives includes inorganic particulates that reflect, scatter, and absorb UV light (such as titanium dioxide, zinc oxide, or combination thereof).

One particular example of a kit suitable for use on a construction site includes a container (e.g., bucket or sack) that packages 9 pounds of SAP composition. A four (4) ounce measuring device (e.g., scoop) is provided with the kit. The kit also includes fifteen (15), 5 gallon size, 5 mil thick plastic bags that are opaque and non-transmissive to UV-light. Bag closures, such as zip-ties, are also included for each bag.

To use this kit, a user (e.g., construction worker such as a bricklayer) would place a provided bag into a 5 gallon bucket, which is readily available on most construction sites. The user would rinse off his tools (e.g., trowel, board, and other tuck-pointing tools) with water in the lined bucket. This would be repeated until the bucket is essentially full of rinse water and cementitious (e.g., mortar) material. One scoop (4 oz.) of the SAP composition is added to the bucket and is optionally stirred. If not already, the water and SAP mixture will gelatinize. Within 1-2 hours, and usually within about 5 minutes, the bucket liner (i.e., the bag) is sealed with a fastener such as a zip-tie and removed from the bucket. The bag can be easily thrown into a dumpster.

In alternate embodiments, the SAP composition could be added to a partially filled bucket, and then additional wastewater added.

Another example of a kit suitable for use on a construction site includes a large container (e.g., 55 gallon drum, 1-ton bulk bag or tote, etc.) that contains the SAP composition. The kit also includes at least one UV-resistant plastic liner (that may or may not be reinforced for strength) configured to fit within a 6 ft×6 ft×3 ft tall open-top tank.

To use this kit, as an example, a user (e.g., construction worker such as a cement truck driver) would position the outlet spout of the cement truck over the lined tank. The user would rinse out the truck using conventional techniques, with the dirty rinse water draining into the lined tank. A sufficient amount of SAP is added to the lined tank to solidify the rinse water. The SAP composition may be added incrementally or as one batch, for example, at the onset or the end of the rinsing process. The mixture may be stirred, for example, with a shovel. Upon solidification of the mixture, the liner is sealed and dumped from the tank into a dumpster, for example, by forklift.

In an alternate embodiment, a kit suitable for use on a construction site includes a large container (e.g., 55 gallon drum, 1-ton bulk bag or tote, etc.) that contains the SAP composition, which includes a UV-stabilizing additive. The kit also includes at least one liquid permeable liner (that may or may not be reinforced for strength) configured to fit within a 6 ft×6 ft×3 ft tall open-top tank. The liquid permeable liner could be referred to as a filter.

To use this kit, as an example, a user (e.g., construction worker such as a cement truck driver) would position the outlet spout of the cement truck over the lined tank. The user would rinse out the truck using conventional techniques, with the dirty wash out water draining into the lined tank. Particulate material will remain in the liner while a portion of the liquid component (i.e., dirty water) will filter through the liner and be collected and preferably recycled into a subsequent concrete batch. A sufficient amount of SAP composition is added to the material in the liner to solidify any liquid remaining in the liner. The SAP composition may be added incrementally or as one batch, for example, at the onset or the end of the rinsing process. The mixture may be stirred, for example, with a shovel, to gelatinize the mixture. Upon solidification of the mixture, the liquid permeable liner may be lifted from the tank (for example by forklift), optionally with the liner sealed, to allow any non-gelatinized liquid to drip out from the liner. The liner may dumped into a dumpster, or, the gelatinized solid mixture may be dumped from the liner and the liner reused.

In alternate methods, the SAP composition may be added to the dirty rinse water before filtering from the particulate material, thus solidifying all of the liquid in the original wash out. In this process, however, the resulting volume of gelatinized solid material is greater than if a portion of the liquid is filtered out.

Thus, embodiments of CONCRETE WASH WATER SOLIDIFICATION PRODUCTS AND METHODS are disclosed. Various modifications and alterations of this invention will become apparent to those skilled in the art without departing from the scope and spirit of this invention, and it should be understood that this invention is not to be unduly limited to the illustrative embodiments set forth herein. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method for solidifying wastewater comprising cementitious residue, the method comprising:
    combining the wastewater with a super absorbent polymer composition comprising sodium polyacrylate and zeolite to form a gelatinous mixture;
    placing the mixture in UV-light non-transmissive packaging; and
    closing the packaging with the mixture therein to inhibit access of UV-light to the mixture.

2. The method of claim 1 further comprising sealing the packaging with the mixture therein.

3. The method of claim 2 further comprising discarding the sealed packaging.

4. The method of claim 1 wherein the super absorbent polymer composition comprises at least two different particle size ranges.

5. The method of claim 1 wherein the step of combining the wastewater with a super absorbent polymer composition is done in the UV-light non-transmissive packaging.

6. The method of claim 1 wherein about 1 to 4 ounces of super absorbent polymer composition is combined with one gallon of wastewater.

7. A method for solidifying wastewater comprising cementitious residue, the method comprising:
    combining the wastewater with a super absorbent polymer composition in UV-light non-transmissive packaging to form a gelatinous mixture; and
    closing the packaging with the mixture therein to inhibit access of UV-light to the mixture.

8. The method of claim 7 further comprising sealing the packaging with the mixture therein.

9. The method of claim 8 further comprising discarding the sealed packaging.

10. The method of claim 7 wherein the super absorbent polymer composition comprises at least two different particle size ranges of super absorbent polymer.

11. The method of claim 7 wherein the super absorbent polymer composition comprises sodium polyacrylate and zeolite.

* * * * *